United States Patent
Xi et al.

(10) Patent No.: US 10,820,285 B2
(45) Date of Patent: Oct. 27, 2020

(54) METHOD FOR NETWORK SYNCHRONIZATION

(71) Applicant: Hitron Technologies Inc., Hsinchu (TW)

(72) Inventors: Haibo Xi, Suzhou (CN); Zhongxi Zhu, Suzhou (CN); Xiaowei Qian, Suzhou (CN)

(*) Notice: Subject to any disclaimer, the term of this patent is extended or adjusted under 35 U.S.C. 154(b) by 52 days.

(21) Appl. No.: 16/199,238

(22) Filed: Nov. 26, 2018

(65) Prior Publication Data
US 2020/0169971 A1    May 28, 2020

(51) Int. Cl.
*H04W 56/00* (2009.01)
*H04L 12/24* (2006.01)
*H04W 12/00* (2009.01)
*H04L 29/06* (2006.01)

(52) U.S. Cl.
CPC ....... *H04W 56/001* (2013.01); *H04L 41/0853* (2013.01); *H04L 41/0873* (2013.01); *H04L 41/0893* (2013.01); *H04W 12/00512* (2019.01); *H04L 65/80* (2013.01)

(58) Field of Classification Search
CPC ........... H04W 56/001; H04W 56/0015; H04W 56/002; H04W 56/0025; H04W 12/00512; H04L 41/085; H04L 41/0853; H04L 41/0866; H04L 41/0869; H04L 41/0873; H04L 41/0893; H04L 65/80
See application file for complete search history.

(56) References Cited

U.S. PATENT DOCUMENTS

| | | | | |
|---|---|---|---|---|
| 6,725,262 B1* | 4/2004 | Choquier | .............. | H04L 41/082 709/208 |
| 10,275,851 B1* | 4/2019 | Zhao | ...................... | G09G 5/006 |
| 2003/0087629 A1* | 5/2003 | Juitt | ...................... | H04W 12/08 455/411 |
| 2005/0193080 A1* | 9/2005 | Gold | ...................... | H04L 41/082 709/208 |
| 2005/0260973 A1* | 11/2005 | van de Groenendaal | | H04L 63/102 455/411 |
| 2008/0069013 A1* | 3/2008 | Monier | ............. | H04W 56/0015 370/277 |
| 2010/0173586 A1* | 7/2010 | McHenry | ............ | H04L 27/0006 455/62 |
| 2014/0200929 A1* | 7/2014 | Fitzgerald | ............... | G06F 21/88 705/4 |

(Continued)

*Primary Examiner* — Kevin D Mew
(74) *Attorney, Agent, or Firm* — Laurence Kao; Opes IP Consulting Co. Ltd.

(57) ABSTRACT

A method for network synchronization is provided, the method comprises the steps of: establishing communication with a first network device on a system network; requesting a device configuration of the first network device while the first network device supporting a predetermined header; determining a synchronization status of the first network device according to the device configuration; providing a predetermined network setting to the first network device when the synchronization status indicates the first network device is unsynchronized; and maintaining a device list according to the device configuration, wherein the device list is accessible to a second network device on the system network. As the result, the method for network synchronization can provide a stable and seamless network.

14 Claims, 3 Drawing Sheets

(56) References Cited

U.S. PATENT DOCUMENTS

| | | | |
|---|---|---|---|
| 2015/0006633 A1* | 1/2015 | Vandwalle | H04L 67/1051 |
| | | | 709/204 |
| 2016/0359669 A1* | 12/2016 | Wackerly | H04L 12/1886 |
| 2016/0373372 A1* | 12/2016 | Gillon | H04L 47/74 |
| 2017/0048323 A1* | 2/2017 | Schlapfer | H04L 67/02 |
| 2017/0063986 A1* | 3/2017 | Gopal | H04L 67/1095 |
| 2018/0184283 A1* | 6/2018 | Singh | H04W 76/15 |
| 2020/0042362 A1* | 2/2020 | Cui | G06F 9/505 |

* cited by examiner

METHOD FOR NETWORK SYNCHRONIZATION

FIELD

The present disclosure relates to a device communication method, and more particularly to a network synchronization method between network devices.

BACKGROUND

Wireless communication technology, such as Wi-Fi, is generally used and accepted by portable device users. For users, not requiring physical connections, i.e., cables, to connect their portable devices to the system network is important. In general, gateway device can only transmit wireless signal with limited power and cover limited service area. In order to provide widely covered service area, more than one gateway device may be required to provide the wireless signal, for example, several network extending devices may be applied on the same system network.

The key issue in the traditional system network is that the wireless signal may be unstable. Particularly, since each network extending device has its own service area, portable device carried by a user traveling from one area to another may be required to change network settings and reconnect to new system network. Constant reconnection to the system network can deteriorate user experience and is a major issue that needed to be addressed.

Further, when a system network adds a new network extending device, it is burdensome for the administrator to be required to set up the new device each time. Therefore, a solution to shorten the set up time and simplify the set up procedure is needed.

SUMMARY

The present disclosure discloses a method for network synchronization, the method provides a seamless network environment, and different network devices can share the same network setting. Therefore, the method can provide a stable system network where portable device does not have to change network settings or reconnect to the system network, as long as the portable device remains in the same system network.

A method for network synchronization is provided, the method comprises the steps of: establishing communication with a first network device on a system network; requesting a device configuration of the first network device while the first network device supporting a predetermined header; determining a synchronization status of the first network device according to the device configuration; providing a predetermined network setting to the first network device when the synchronization status indicates the first network device is unsynchronized; and maintaining a device list according to the device configuration, wherein the device list is accessible to a second network device on the system network.

In an explanatory embodiment, after the step of requesting the device configuration of the first network device, the method further comprises: executing a security process according to the device configuration; and generating a security result to indicate whether or not the first network device is authorized; wherein predetermined network setting is provided when the first network device is authorized. Besides, the security process comprises the steps of: determining whether or not a device type or a device model, found in device configuration of the first network device, matches a predetermined security data. The predetermined security data comprises at least one authorized device type or at least one authorized device model, when the device type or the device model matches the authorized device type or the authorized device model, the first network device is authorized.

In another explanatory embodiment, the security process comprises the steps of: determining whether a WiFi setting, found in device configuration of the first network device, matches a predetermined security data. The predetermined security data comprises at least one authorized WiFi setting, when the WiFi setting matches the authorized WiFi setting, the first network device is authorized.

In another explanatory embodiment, the security process comprises the steps of: determining whether a verification code, found in device configuration of the first network device, matches a predetermined security data. The predetermined security data comprises at least one authorized verification code, when the verification code matches the authorized verification code, the first network device is authorized. The authorized verification code is updated manually or automatically.

A method for network synchronization is provided, the method comprises the steps of: establishing communication with a plurality of network devices on a system network; providing a device configuration upon a request having a predetermined header; receiving a predetermined network setting applied by the plurality of network devices on the system network; providing network service after the predetermined network setting is applied.

Therefore, the method for network synchronization can provide a stable system network where a portable device is not required to change network settings or reconnect to the system network when travelling within the network. Further, the method also discloses a security process to determine whether or not a network device is authorized in order to provide a seamless and secured network environment.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

Figure 1:
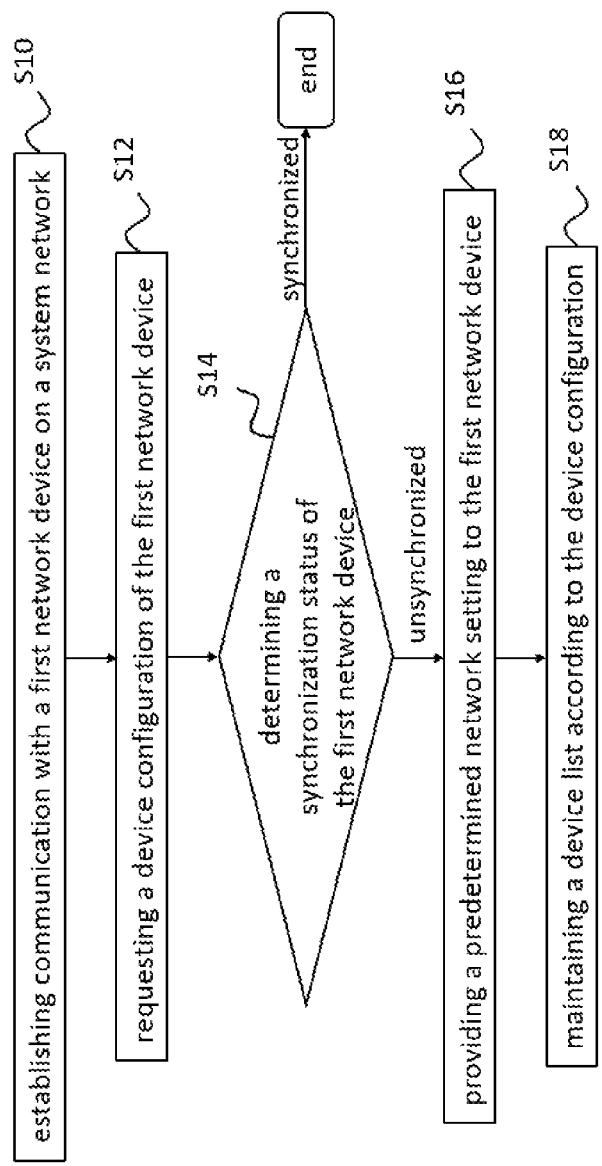
FIG. 1 illustrates a flow diagram of the method for network synchronization according to an exemplary embodiment of this invention.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention. Any reference signs in the claims shall not be construed as limiting the scope. Like reference symbols in the various drawings indicate like elements.

DETAILED DESCRIPTION OF THE DISCLOSURE

The making and using of the embodiments of the disclosure are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Throughout the various views and illustrative embodiments, like reference numerals are used to designate like elements. Reference will now be made in detail to exemplary embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, an apparatus in accordance with the present disclosure. It is to be understood that elements not specifically shown or described may take various forms. Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. It should be appreciated that the following figures are not drawn to scale; rather, these figures are merely intended for illustration.

In the drawings, like reference numbers are used to designate like or similar elements throughout the various views, and illustrative embodiments of the present disclosure are shown and described. The figures are not necessarily drawn to scale, and in some instances the drawings have been exaggerated and/or simplified in places for illustrative purposes. One of ordinary skill in the art will appreciate the many possible applications and variations of the present disclosure based on the following illustrative embodiments of the present disclosure.

It will be understood that when an element is referred to as being "on" another element, it can be directly on the other element or intervening elements may be present. In contrast, when an element is referred to as being "directly on" another element, there are no intervening elements present.

It will be understood that singular forms "a", "an" and "the" are intended to include the plural forms as well, unless the context clearly indicates otherwise. Furthermore, relative terms, such as "bottom" and "top," may be used herein to describe one element's relationship to other elements as illustrated in the Figures.

It will be understood that elements described as "under" or "below" other elements would then be oriented "over" or "above" the other elements. The exemplary terms "under" or "below" can, therefore, encompass both an orientation of over and under.

Unless otherwise defined, all terms (including technical and scientific terms) used herein have the same meaning as commonly understood by one of ordinary skill in the art to which this disclosure belongs. It will be further understood that terms; such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
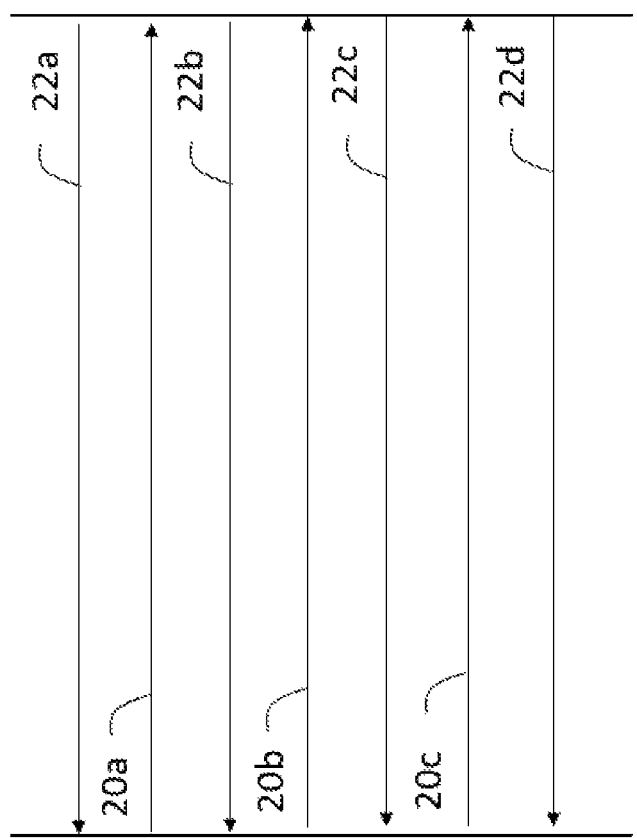
FIG. 2 illustrates a signaling diagram of the discovery process and the network synchronization process according to an exemplary embodiment of this invention.

Please refer to FIG. 1 and FIG. 2, FIG. 1 illustrates a flow diagram of the method for network synchronization according to an exemplary embodiment of this invention. FIG. 2 illustrates a signaling diagram of the discovery process and the network synchronization process according to an exemplary embodiment of this invention. As shown in the figures, in step S10, the communication between a network device 20 and a network device 22 is established in the first place. The network device 20 can represent one of the network devices already on a system network, and the network device 22 can represent a new network devices which has yet to join the system network. For example, the network device 20 and the network device 22 could be, but not limited to, wirelessly connected to each other, the network device 20 and the network device 22 can also be physically connected by cable.

In an explanatory embodiment, the established communication not only means physically or wirelessly connection between the network device 20 and the network device 22, but can also mean completion of a discovery process. The discovery process can start with the network device 22 sending a request 22a for notifying its existence, the network device 20 receives the request 22a and can send another request 20a for searching new network devices. Once the network device 22 sends a response 22b corresponding to the request 20a sent from the network device 20, the discovery process will be completed. It usually takes place when the network device 22 is a new network extending device which is going to join an existing system network for the first time, or when the network device 22 reboots itself. The network device 20 could be a gateway device which is the control point of the existing system network. In practice, when the network device 22, as a network extending device, joins the existing system network for the first time, re-joins the existing system network, or changes IP address or configurations, the network device 22 can send a request to start the discovery process.

In another explanatory embodiment, the discovery process can also start with the network device 20 sending a request 20a for searching new network devices. Once the network device 22 sends a response 22b corresponding to the request 20a sent from the network device 20, the discovery process is completed. This usually takes place when the network device 20 is a gateway device which is going to establish a new system network, when the network device 20 reboots itself, or when network settings of the network device 20 are changed. The network device 22 could be a network extending device nearby the network device 20. In practice, when the network device 20, as a gateway device, goes online, it may need to locate one or more network extending devices, the network device 20 can send a request to start the discovery process.

After the communication between the network device 20 and the network device 22 is established, the network device 20 and the network device 22 may proceed to the next step, which is a network synchronization process. In step S12, the network device 20 will send a request 20b for asking a device configuration of the network device 22, if the network device 22 supports a predetermined header. In an explanatory embodiment, the network device 20 can send a request 20b, having the predetermined header, for asking a device configuration. Although approximately all connected network devices 22 can receive the request 20b from the network device 20, only specific network devices capable of recognizing the predetermined header can response to the request 20b. For example, the network device 22, as a network extending device supporting the predetermined header, will send a response 22c comprising its device configuration to the network device 20, as a gateway device.

To be noted, only when the network device 22 accepts by the network device 20, the response 22c can be received by the network device 20. In practice, the predetermined header could be, but not limited to, related to a specific device type or a specific device model.

The device configuration can comprise a lot of information related to the network device 22, such as WiFi setting (e.g. SSID), device type, device model, synchronization status, verification code, device location or other corresponding information. In step S14, the network device 20 can determine the synchronization status of the network device 22 according to its device configuration within the response 22c. In an explanatory embodiment, the synchronization status can indicate whether the network device 22 is synchronized or unsynchronized, and the synchronization status can be a part of the device configuration. For example, when the network device 22 is not synchronized, the synchronization status can be "unsynced". When the network device 22 applies the predetermined network setting, the synchronization status can be changed to "synced". Therefore, when the network device 20 analyzes the device configuration and finds that the synchronization status is "synced", which indicates the network device 22 is already synchronized, the network device 20 may consider the network synchronization process is completed. Conversely, when the network device 20 analyzes the device configuration and finds that the synchronization status is "unsynced", which indicates the network device 22 is not synchronized, the network device 20 continues the network synchronization process.

In step S16, when the network device 20 analyzes the device configuration and finds that the network device 22 is not synchronized, the network device 20 can send a massage 20c comprising a predetermined network setting to the network device 22. In an explanatory embodiment, the predetermined network setting could be, but not limited to, the network setting currently used by the network device 20 or other network devices on the system network. The network device 20 and the network device 22 can both apply to a new network setting as well. Besides, the network device 22 can provide a confirmation massage 22d after receiving the predetermined network setting, and the network device 22 can apply the predetermined network setting so that the network synchronization process can be completed. The network device 22 can provide network service, or can join the system network, after the predetermined network setting is applied.

In step S18, the network device 20 can record the device configuration of each network device on the system network, and generate a device list. In an explanatory embodiment, the device list can comprise not only the device configuration of each network device in the system network, but also the predetermined network setting. Besides, the device list can be stored in the network device 20, such as a gateway device, or a server coupled to the system network. The device list can be updated manually or automatically, and the device list, in general, is accessible to all network devices on the system network. For example, another network device newly joined the system network can apply the predetermined network setting that is the same as the network setting of the network device 20 and the network device 22. Therefore, the network devices using the method disclosed in the explanatory embodiment can provide a seamless network environment.

Figure 3:
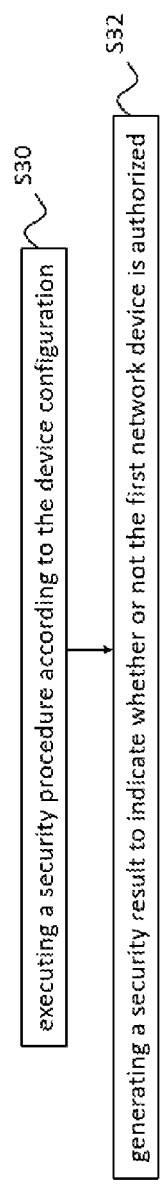
FIG. 3 illustrates a flow diagram of the security procedure according to an exemplary embodiment of this invention.

The method can further comprises a security process to determine if a network device is authorized. Please refer to FIG. 1 and FIG. 3, FIG. 3 illustrates a flow diagram of the security procedure according to an exemplary embodiment of this invention. As shown in figures, in step 30, when the network device 20 receives the device configuration of the network device 22, the network device 20 may further execute a security process according to the device configuration. Through this security process, the network device 20 can determine if the network device 22 is "safe" or "authorized". In step 32, after the network device 20 executed a security process and analyzed the device configuration, the network device 20 can generate a security result to indicate whether the network device 22 is authorized. If the network device 20 accepts an unauthorized network device into the system network, it may cause serious information security issue. In an explanatory embodiment, only the authorized network devices can join the system network and receive the predetermined network setting.

The security process can be executed automatically or manually. Network device failed to pass the security process may either be removed from the system network, or is required to update its authentication. In an explanatory embodiment of the security process, the network device 20 can determine whether a device type or a device model, found in the device configuration of the network device 22, matches a predetermined security data. In practice, the predetermined security data recorded by the network device 20 can comprise at least one authorized device type or at least one authorized device model. If a device type or device model of the network device 22 matches the authorized device type or device model, the network device 22 is considered authorized. Further, the information within the device type or the device model can comprise a product name, a product model, a brand name, a product number, an abbreviation of a product, or functionality of product. Not all types of network devices can join the system network; network devices having different brand, different name, different model, or lacking certain functionalities may not be allowed to join the system network.

In another explanatory embodiment of the security process, the network device 20 can determine if a WiFi setting, found in the device configuration of the network device 22, matches a predetermined security data. In practice, the predetermined security data recorded by the network device 20 can comprise at least one authorized WiFi setting, when the WiFi setting of the network device 22 matches the authorized WiFi setting, the network device 22 is considered authorized. The network device 20 can maintain several authorized WiFi settings, such as an ID list. And only the WiFi setting of the network device 22 can be found in the ID list, the network device 22 can be allowed to join the system network.

In the other explanatory embodiment of the security process, the network device 20 can determine whether a verification code, found in the device configuration of the network device 22, matches a predetermined security data. In practice, the predetermined security data recorded by the network device 20 can comprise at least one authorized verification code. If the verification code of the network device 22 matches the authorized verification code, the network device 22 is considered authorized. The network device 20 can maintain several verification codes, such as a code list. And only if the verification code of the network device 22 is found in the code list can the network device 22 be allowed to join the system network. The predetermined security data, such as the WiFi setting, the device type, the device model, the verification code or other corresponding information, recorded by the network device 20 can be updated manually or automatically to maintain information security.

In sum, gateway devices or network extending devices can automatically share the same network setting, and provide a stable and seamless system network. The portable device utilizing the system network does not need to change network settings or reconnect to the system network while travelling across different service areas of the network extending devices. Further, the method also discloses a security process to determine whether a network device is authorized, thereby increasing information security.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

LISTING OF ELEMENTS

S10 to S18 steps
20 and 22 network device
20a to 20c and 22a to 22d signal
S30 to S32 steps

What is claimed is:

1. Method for network synchronization comprising the following steps:
    establishing communication with a first network device on a system network;
    requesting a device configuration of the first network device while the first network device supporting a predetermined header;
    determining a synchronization status of the first network device according to the device configuration;
    providing a predetermined network setting to the first network device when the synchronization status indicates the first network device is unsynchronized; and
    maintaining a device list according to the device configuration, wherein the device list is accessible to a second network device on the system network.

2. The method for network synchronization according to claim 1, further comprises:
    executing a security process according to the device configuration; and
    generating a security result to indicate if the first network device is authorized;
    wherein the predetermined network setting is provided when the first network device is authorized.

3. The method for network synchronization according to claim 2, wherein the security process comprises:
    determining if a device type or a device model, found in the device configuration of the first network device, matches a predetermined security data.

4. The method for network synchronization according to claim 3, the predetermined security data further comprises at least one authorized device type or at least one authorized device model wherein the first network device is considered authorized if its device type or device model matches the authorized device type or authorized device model of the predetermined security data.

5. The method for network synchronization according to claim 2, wherein the security process comprises:
    determining if a WiFi setting, found in device configuration of the first network device, matches a predetermined security data.

6. The method for network synchronization according to claim 5, the predetermined security data further comprises at least one authorized WiFi setting wherein the first network device is considered authorized if its WiFi setting matches the authorized WiFi setting of the predetermined security data.

7. The method for network synchronization according to claim 6, wherein the authorized WiFi setting is updated manually or automatically.

8. The method for network synchronization according to claim 2, wherein the security process comprises:
    determining if a verification code, found in device configuration of the first network device, matches a predetermined security data.

9. The method for network synchronization according to claim 7, the predetermined security data further comprises at least one authorized verification code wherein the first network device is considered authorized if its verification code matches the authorized verification code of the predetermined security data.

10. The method for network synchronization according to claim 9, wherein the authorized verification code is updated manually or automatically.

11. The method for network synchronization according to claim 1, wherein the device list is stored in a gateway device or a server coupled to the system network.

12. The method for network synchronization according to claim 1, wherein the communication with the first network device on the system network is established wirelessly.

13. The method for network synchronization according to claim 1, further comprising a discovery process.

14. The method for network synchronization according to claim 13, wherein the discovery process comprises:
    sending, to the second network device, a first request from the first network device for notifying its existence;
    sending, by the second network device, a second request for searching; and
    responding, by the first network device, to the second request.

* * * * *